(12) United States Patent
Su

(10) Patent No.: US 6,801,189 B1
(45) Date of Patent: Oct. 5, 2004

(54) AXLE DOCK FOR GENERATING CLICKING SENSE FOR MOUSE ROLLER

(75) Inventor: Tsui-Jung Su, Hsin-Tien (TW)

(73) Assignee: Shin Jiuh Corp., Taipei Hsien (TW)

( * ) Notice: Subject to any disclaimer, the term of this patent is extended or adjusted under 35 U.S.C. 154(b) by 265 days.

(21) Appl. No.: 10/191,422

(22) Filed: Jul. 10, 2002

(51) Int. Cl.[7] .................................................. G09G 5/00
(52) U.S. Cl. ......................... 345/163; 345/156; 345/164
(58) Field of Search ................................ 345/156, 157, 345/163–166, 184

(56) References Cited

U.S. PATENT DOCUMENTS

| | | | | |
|---|---|---|---|---|
| 6,157,369 A | * | 12/2000 | Merminod et al. | ......... 345/157 |
| 6,326,949 B1 | * | 12/2001 | Merminod et al. | ......... 345/163 |
| 6,400,356 B1 | * | 6/2002 | Bidiville et al. | ............ 345/163 |
| 6,429,848 B2 | * | 8/2002 | Merminod et al. | ......... 345/157 |
| 6,570,108 B2 | * | 5/2003 | Lin | ............................ 200/6 B |

* cited by examiner

Primary Examiner—Amare Mengistu
Assistant Examiner—Tom Sheng
(74) Attorney, Agent, or Firm—Birch, Stewart, Kolasch & Birch, LLP

(57) ABSTRACT

An axle dock for generating clicking sense for a mouse roller is coupled with a roller axle. The axle dock has an elastic element corresponding to concave surfaces and convex surfaces formed on an inner wall of the roller. The axle dock has a seat which has a mounting section facing the concave surfaces and the convex surfaces. The elastic element is mounted on the mounting section. The mounting section has retain zones for anchoring the ends of the elastic element and a passing zone to allow a force receiving section of the elastic element to pass through and expose and press the concave surfaces and the convex surfaces. When the roller rotates, the concave surfaces and the convex surfaces slide and press alternately the force receiving section to generate a clicking sense to user's hand. The elastic element makes assembly easier.

5 Claims, 7 Drawing Sheets

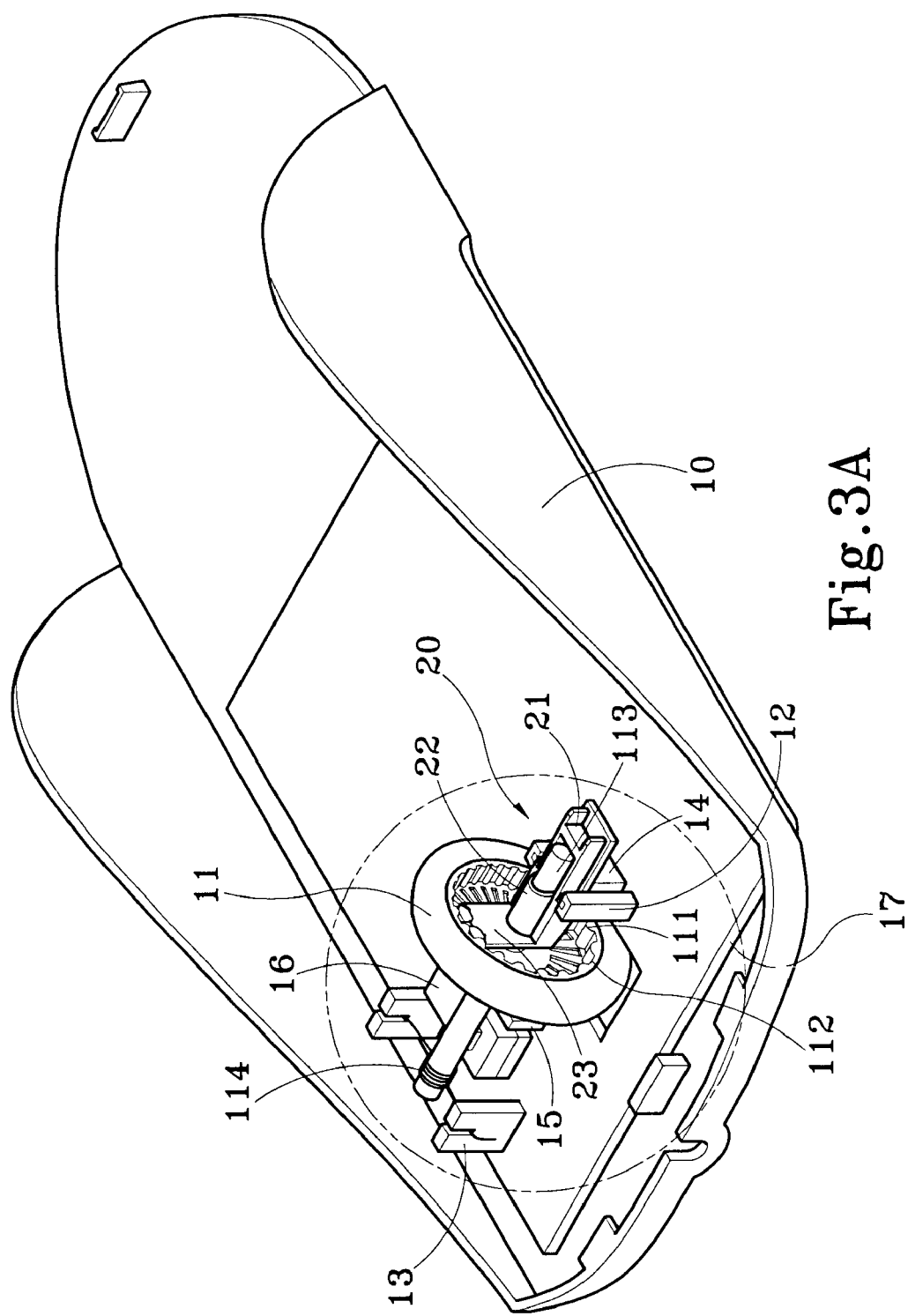

AXLE DOCK FOR GENERATING CLICKING SENSE FOR MOUSE ROLLER

FIELD OF THE INVENTION

The present invention relates to an axle dock for generating clicking sense for a mouse roller and particularly an axle dock installed in the mouse roller to receive alternate pressing of the concave and convex surfaces formed in the roller to generate a clicking sense on an user's hand.

BACKGROUND OF THE INVENTION

In order to improve conventional "three-button" mouse, the mouse devices now being commonly used have a "mouse roller" design to save time and operation procedures for users. On documents, a simple forward or rearward motion through the "mouse roller" can substitute "window scroll axle" motion used by the traditional mouse devices. In application programs of compatible functions, the "mouse roller" can also replace traditional pulling down function table or tool table to alter the size of the document area. And the fastest operation method for browsing Web pages is rolling the scroll axle through the mouse roller. As a result, "mouse roller" has become a fundamental accessory of mouse devices these days.

Different vendors have different designs for the mouse roller 11. However almost every vendor highly emphasizes the clicking sense on user's hand during operation. Refer to FIG. 1 for a conventional approach to generate the clicking sense. There is a bracket 101 extended from an inner wall of the mouse to hold an elastic wire 102. The elastic wire 102 is bent a number of times to contact the concave surfaces 111 and convex surfaces 112 formed on the inner wall of the roller 11. When the roller 11 rotates, the concave surfaces 111 and convex surfaces 112 slide and bounce alternately over the elastic wire 102. The bent elastic wire 102 has elasticity to generate clicking sound and clicking sense on user's hand holding the mouse. However such a design, in order to accommodate the elastic wire 102, requires a special mold for the mouse to make the bracket 101. In addition, another bracket 101 is required to support the axle 113 of the roller 11. As a result, the cost for making mold increases. Assembly also is more difficult. In terms of use, the fulcrum of the elastic wire 102 is located on the bracket 101. The elasticity decreases due to the elastic wire is extended too long. Moreover, the elastic wore 102 is formed by bending a plurality of times. It is prone to produce defects. Clicking sense being generated is different when the elastic wire 102 slides and bounces over the concave surfaces 111 and convex surfaces 112 during rotation of the roller 11. The extended length of the elastic wire 102 also tends to reduce its durability. Furthermore, as the elastic wire 102 is bent to reach the concave surfaces 111 and convex surfaces 112, rotation of the roller 11 that employs the optical grating induction is affected. In the event of the elastic wire 102 drops due to poor fastening, the optical grating is easy to be interfered and accuracy of the signal output of the roller 11 is impacted.

SUMMARY OF THE INVENTION

Therefore the primary object of the invention is to resolve aforesaid disadvantages. The invention provides an axle dock that is easy to assemble, does not incur elastic fatigue, and can shorten elastic displacement to ensure a desired clicking sense is generated to give users a desirable rotation feeling. The axle dock of invention mainly includes an elastic element corresponding to the concave surfaces and the convex surfaces formed on the inner wall of the roller. The axle dock has a seat which has a mounting section facing the concave surfaces and the convex surfaces the roller. The elastic element is mounted on the mounting section. The mounting section has a retain zone for holding the anchor section of the elastic section and a passing zone to allow a force receiving section located on the top end of the elastic element to pass through and expose, and to contact the concave surfaces and the convex surfaces of the roller. When the roller rotates, the concave surfaces and the convex surfaces slide and bounce alternately over the force receiving section. The elasticity of the elastic element gives users a desired clicking sense. The invention also is easy to assemble.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3A is a schematic view of the invention housed in a mouse.

DESCRIPTION OF THE PREFERRED EMBODIMENT

Figure 1:
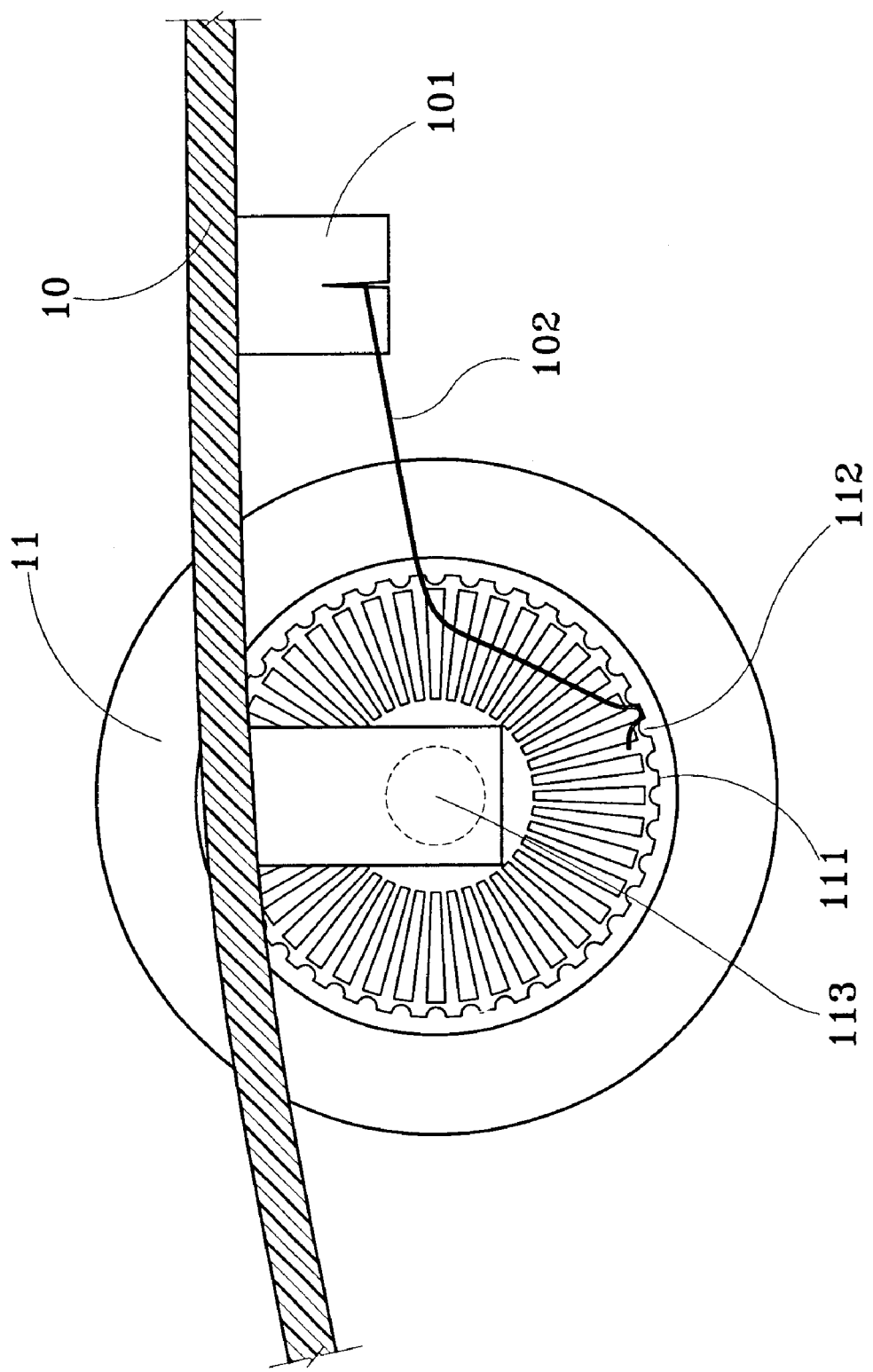
FIG. 1 is a schematic view of the elastic wire configuration of a conventional mouse device.
Figure 2A:
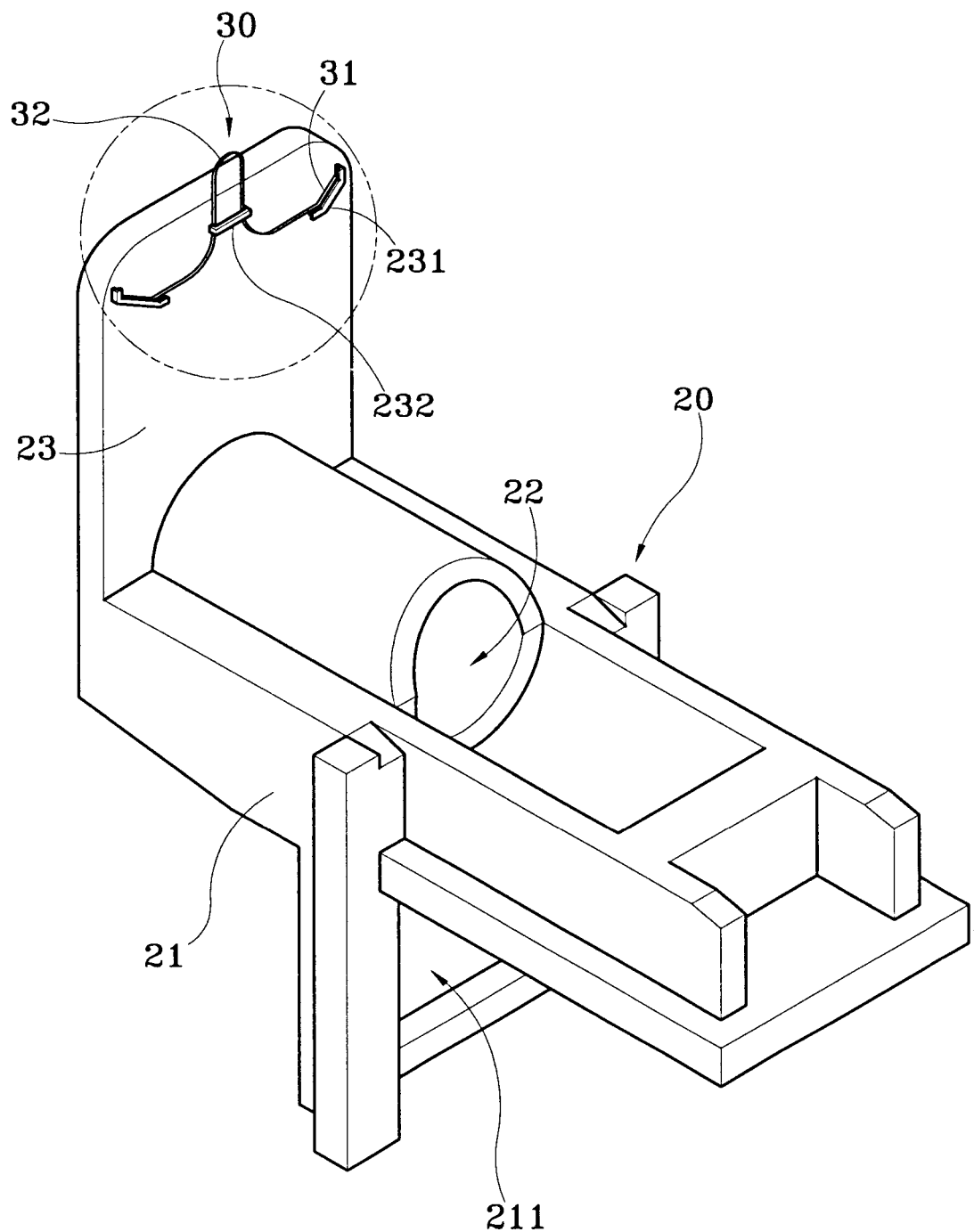
FIG. 2A is a perspective view of the invention.
Figure 2B:
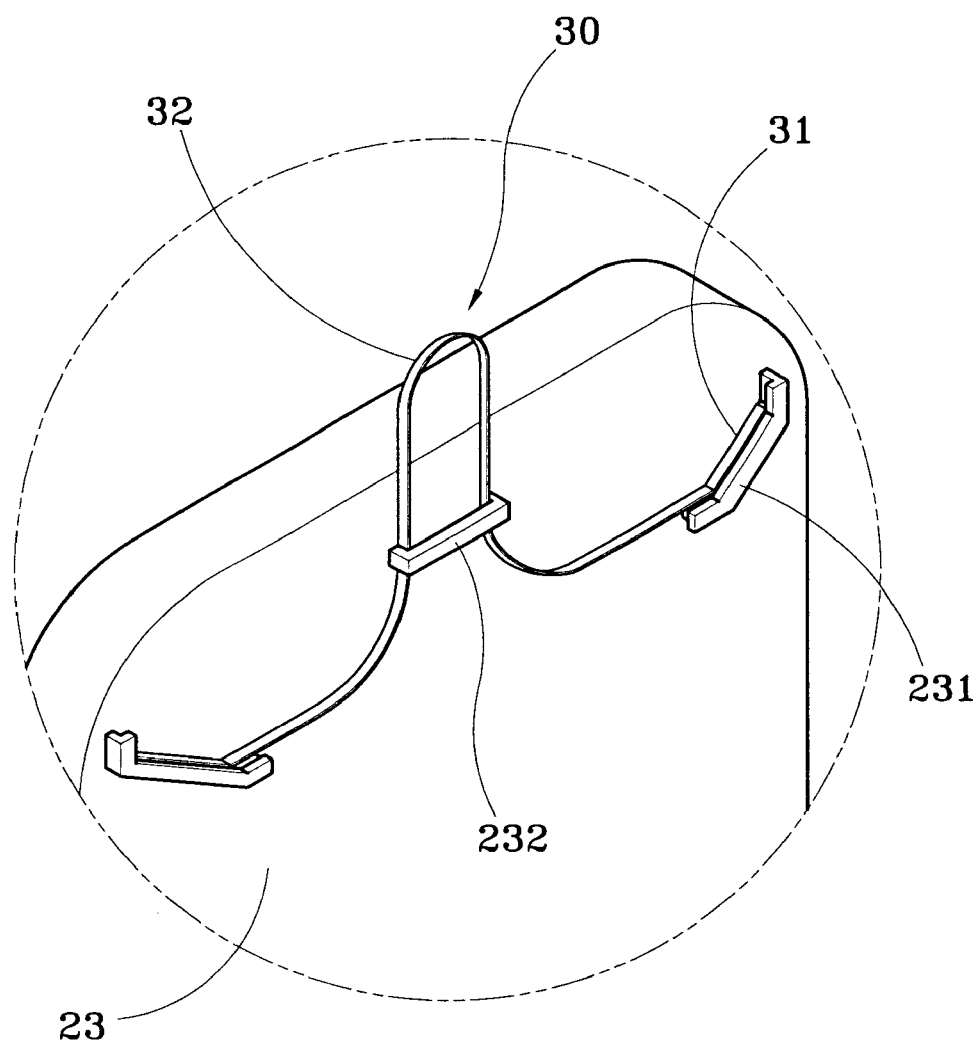
FIG. 2B is a fragmentary enlarged view according to FIG. 2A.
Figure 3B:
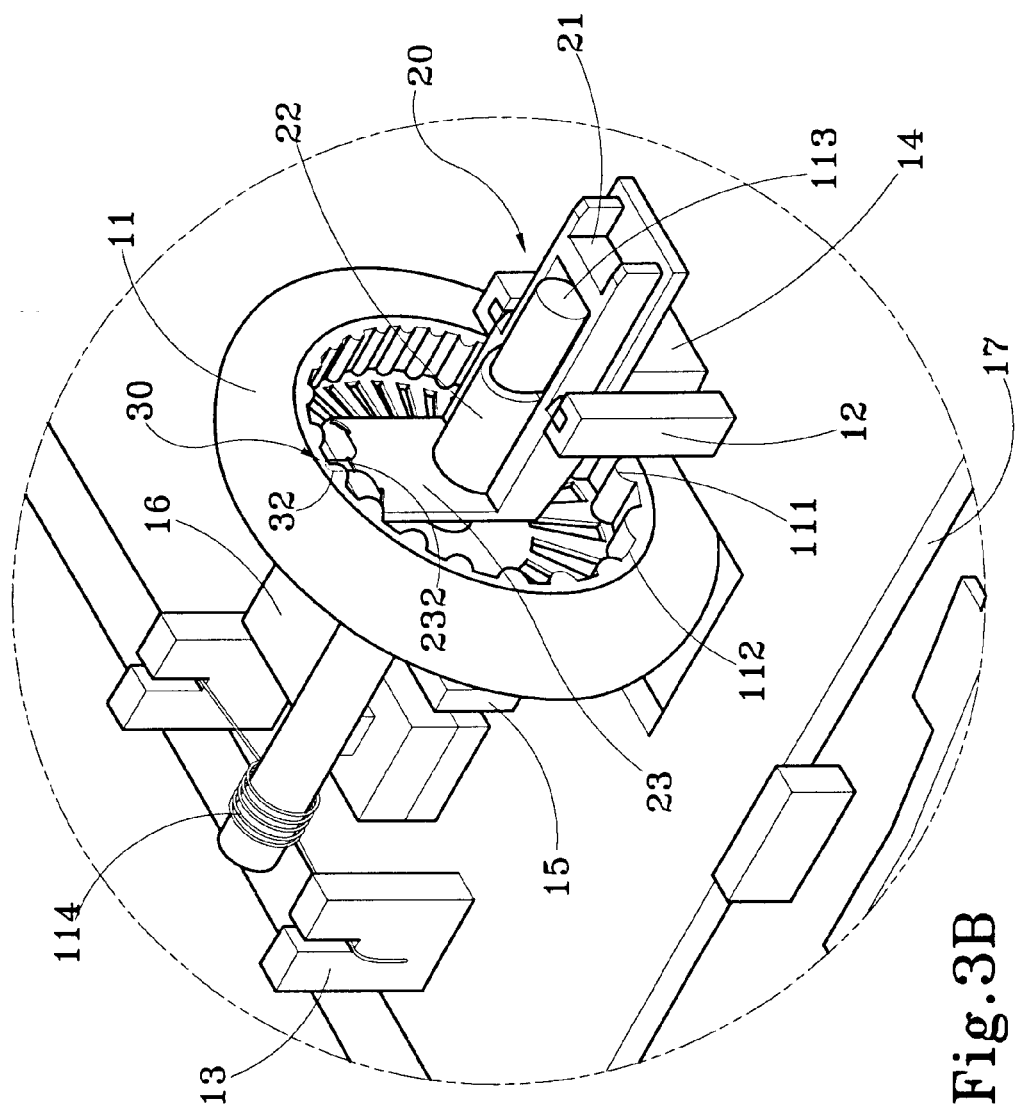
FIG. 3B is a fragmentary enlarged view according to FIG. 3A.

Referring to FIGS. 2A and 2B, the axle dock 20 of the invention is coupled on an axle 113 of a roller 11, and has an elastic element 30 mounted thereon corresponding to concave surfaces 111 and convex surfaces 112 formed on an inner wall of the roller 11. The axle dock 20 includes a seat 21 located in the mouse 10. The seat 21 has a duct 22 for housing the axle 113 of the roller 11. The seat 21 has a mounting section 23 facing the concave surfaces 111 and the convex surfaces 112 that is integrally extended upwards from one end of the duct 22. The mounting section 23 has a retain zone 231 and a passing zone 232. The elastic element 30 is mounted on the mounting section 23, and has an anchor section 31 to engage with the retain zone 231. The anchor section 31 is extended towards the center and bent to form a force receiving section 32 to pass through the passing zone 232 and expose to press the concave surfaces 111 and the convex surfaces 112 of the roller 11. Refer to FIGS. 3A and 3B for the invention installed in the mouse 10. As shown in the drawings, the mouse 10 includes a first frame 12 for mounting the seat 21. The seat 21 has an opening 211 for housing an optical grating 14. The passing zone 232 is formed in a D-shaped outlet to allow the force receiving section 32 to pass through. After the force receiving section 32 has passed through the passing section 232, the elastic element 30 has two ends bent to form respectively an anchor section 31 to engage with a notch formed in the "¬-shaped" retain zone 231. The bent insertion point becomes a fulcrum to provide elasticity to facilitate the coupling of the anchor section 31 with the retain zone 231. Then the axle 113 of the roller 11 may be housed in the duct 22 of the seat 21, and the roller 11 and the axle dock 20 may be mounted on the first frame 12. The other end of the axle 113 may be coupled with a spring 114 to enable the roller 11 to move up or down. The spring 114 has two ends resting on a second frame 13. Below the other end the axle 113, there are a switch 16 connecting to a circuit board 17 and a corresponding optical grating 15. Then the installation of the roller 11 and the axle dock 20 is finished. (Configuration of the spring 114, switch 16, optical gratings 14 and 15, and circuit board 17 depends on the interior design of the mouse 10, and forms no part of the invention, thus is omitted).

Figure 4A:
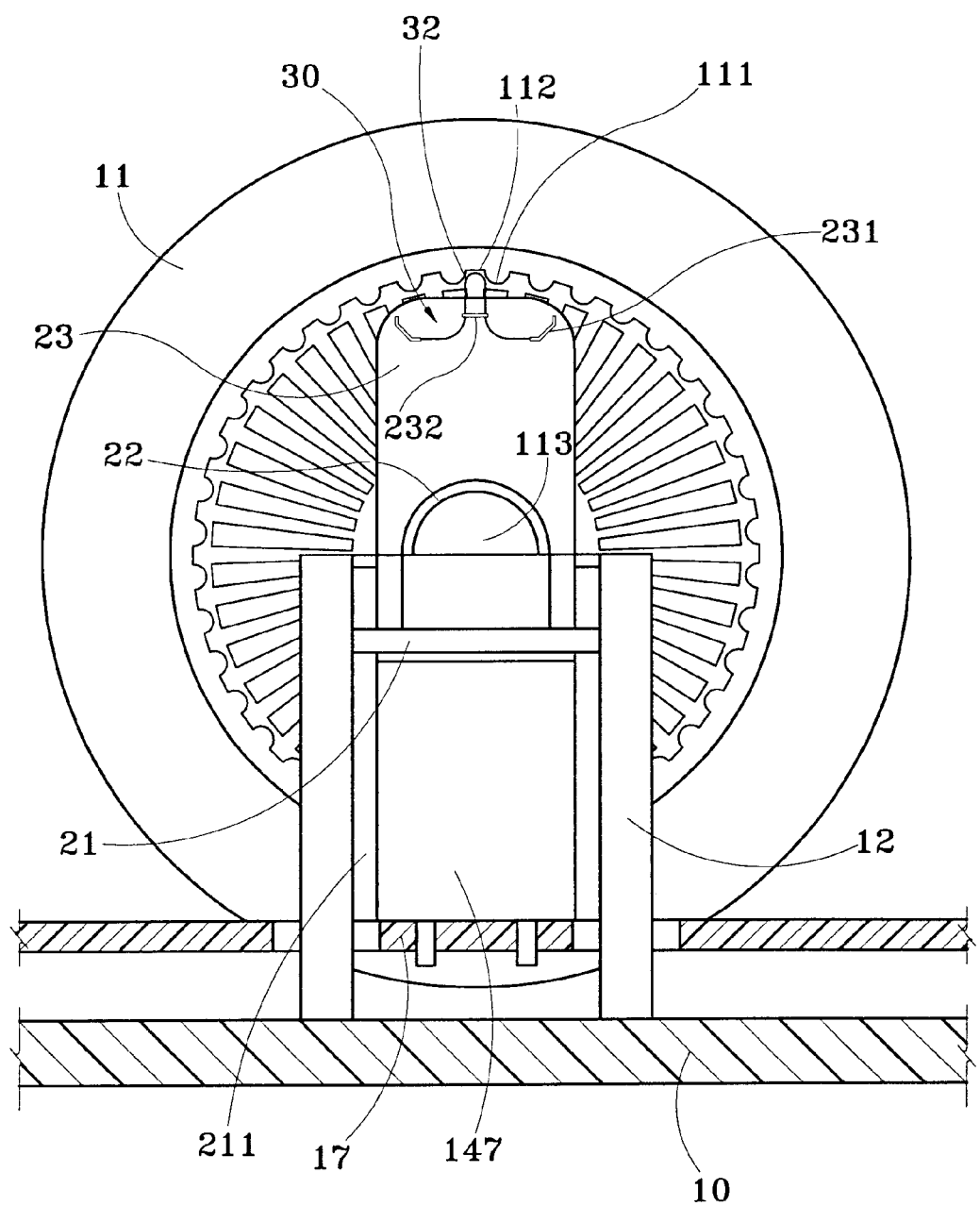
FIGS. 4A and 4B are schematic views of the mouse roller in rotation conditions.
Figure 4B:
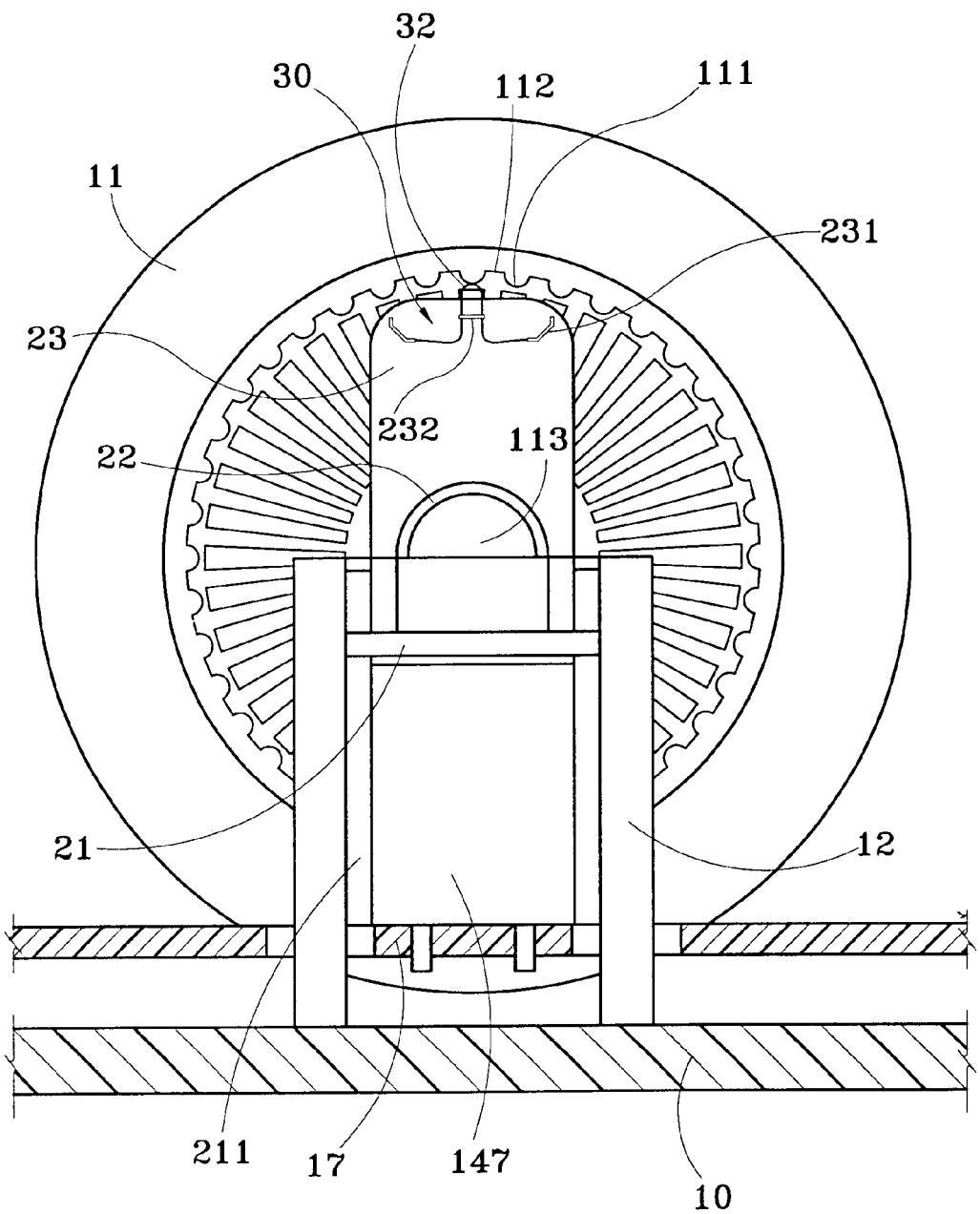

Refer to FIGS. 4A and 4B for the mouse 10 in operation. The roller 11 rotates, the concave surfaces 111 and the convex surfaces 112 in the roller 11 press alternately the force receiving section 32. When the force receiving section 32 is compressed by the convex surfaces 112, the bent fulcrums of the elastic element 30 store the elastic force. When the force receiving section 32 reaches the concave surfaces 111, the stored elastic force is released immediately. Hence a clicking sense is generated and fed to user's hand on the mouse. As the bent portion of the force receiving section 32 of the elastic element 30 is vertical and has a smaller displacement, and the two anchor sections 31 at the two ends are supported in a balanced manner, the elastic element 30 can maintain desired elasticity without decreasing or incurring fatigue. Moreover, installation of the elastic element 30 is easy and can effectively reduce defects and ensure the quality of the clicking sense of the roller 11.

What is claimed is:

1. An axle dock for generating clicking sense for a mouse roller being coupled with a roller axle, and the mouse roller having concave surfaces and convex surfaces formed on an inner wall thereof, comprising:

a axle dock including a seat located in a mouse, the seat having a duct for housing the roller axle and a mounting section facing the concave surfaces and the convex surfaces, the mounting section having a retain zone and a passing zone; and an elastic element mounted on the mounting section having two ends formed respectively an anchor section to engage with the retain zone, the anchor section being extended towards the center thereof and bent to form a force receiving section to pass through the passing zone and expose and press the concave surfaces and the convex surfaces such that the concave surfaces and the convex surfaces sliding and pressing alternately the force receiving section when the roller is turned to allow the elastic element to generate a clicking sense to user's hand and to facilitate assembly.

2. The axle dock for generating clicking sense for a mouse roller of claim 1, wherein the mouse has a first frame for supporting the seat, the seat having an opening for housing an optical grating.

3. The axle dock for generating clicking sense for a mouse roller of claim 1, wherein the mounting section is formed by integrally extending one end of the duct upwards.

4. The axle dock for generating clicking sense for a mouse roller of claim 1, wherein the passing zone is formed in a D-shaped outlet to allow the force receiving section to pass through.

5. The axle dock for generating clicking sense for a mouse roller of claim 1, wherein the retain zone is formed in a "¬-shaped" with a notch to engage with the anchor section.

* * * * *